D. MACDONALD.
AUTOMOBILE STEERING ATTACHMENT.
APPLICATION FILED OCT. 8, 1917.
1,328,681.  
Patented Jan. 20, 1920.
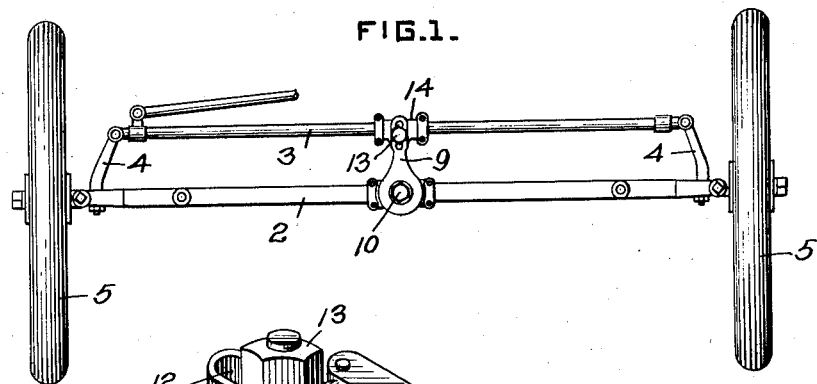
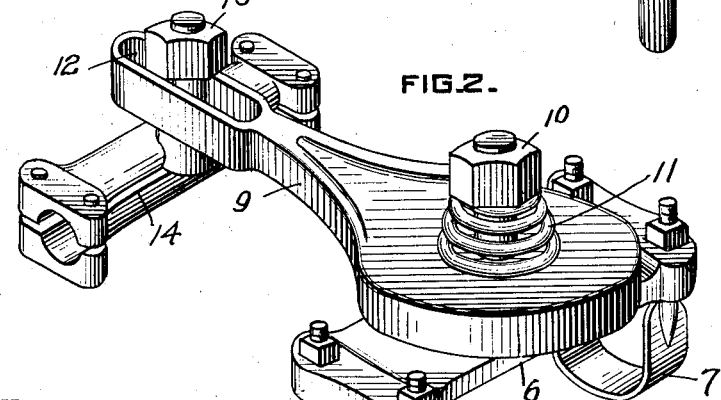
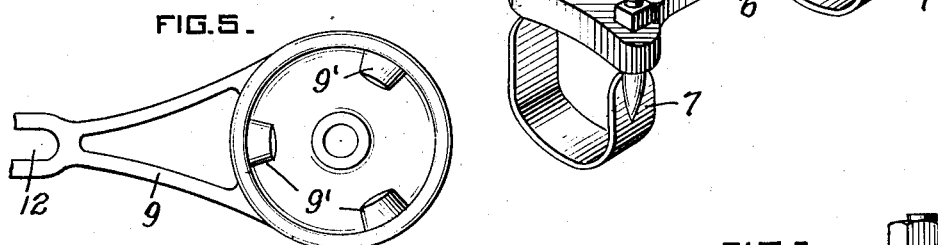
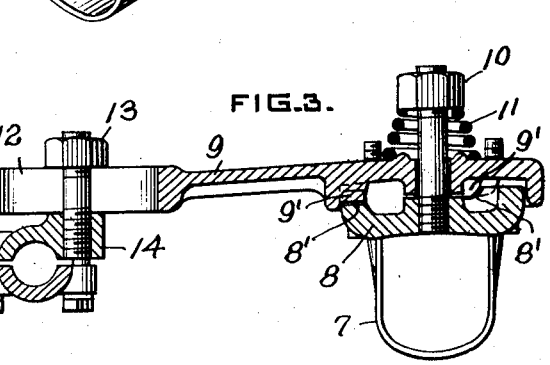
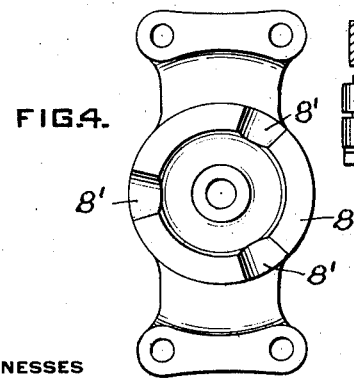
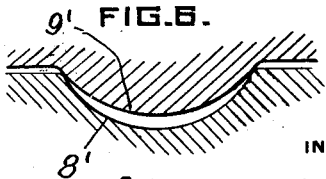
WITNESSES  
INVENTOR

UNITED STATES PATENT OFFICE.

DUNCAN MACDONALD, OF WEST HOMESTEAD, PENNSYLVANIA.

AUTOMOBILE STEERING ATTACHMENT.

1,328,681.  Specification of Letters Patent.  Patented Jan. 20, 1920.

Application filed October 8, 1917. Serial No. 195,281.

*To all whom it may concern:*

Be it known that I, DUNCAN MACDONALD, a citizen of the United States, and resident of West Homestead, in the county of Allegheny and State of Pennsylvania, have invented certain new and useful Improvements in Automobile Steering Attachments, of which the following is a specification.

The object of this invention is to provide a simple and efficient device for maintaining the steering mechanism of a road vehicle normally centered, relieving the driver of much of the strain and labor ordinarily incident to maintaining the vehicle in a straight course, and relieving both the car and the driver of severe road shocks usually transmitted to and through the steering wheel resulting from obstructions or depressions encountered by the road wheels. While the resistance is sufficient to relieve the driver of the constant strain incident to steering a straight course, it is not sufficient to interfere with the necessary manipulation of the steering mechanism incident to guiding the vehicle around curves, etc., the resistance being readily overcome upon turning the steering wheel. The operation is facilitated by the fact that the resistance is only momentary, being active only as the device starts from centered position, the resistance then immediately discontinuing and is not active until the device is again centered.

The invention is embodied in mechanism of simple construction which may be readily applied to the axle and the steering rod of an automobile and when in position thereon operating to hold the axle and rod in normally fixed position with relation to each other.

In the accompanying drawings, Figure 1 is a view in top plan of a steering mechanism of an automobile equipped with the improved device. Fig. 2 is a perspective of the device. Fig. 3 is a sectional elevation of the same. Fig. 4 is a plan view of the head-like member of the device secured to the axle, and Fig. 5 is an inverted plan of the rotatable arm member. Fig. 6 is a sectional elevation, enlarged, taken through one of the pairs of interfitting projections and depressions.

Referring to the drawings, 2 designates the front axle of an automobile, and 3 the steering rod which connects knuckles 4 on which ground wheels 5 are mounted.

The steering device as here embodied consists of a plate-like head 6 adapted to be secured by clips 7 to the axle. Plate 6 is formed at its upper side with the annular bearing face 8 formed with rounded depressions 8', and rotatably mounted on plate 6 is arm 9 having its under side shaped to bear on face 8 and formed with rounded lugs or projections 9' which are adapted to enter depressions 8'. A bolt 10 rotatably secures arm 9 to head 6, with a spring 11 on the bolt above the arm for yieldingly holding the arm in engagement with the head and opposing the turning movement in either direction, such as would result in moving projections 9' out of depressions 8'. The projecting portion of arm 9 is slotted at 12 and connected by bolt 13 and clamp 14 with the steering rod 3.

In operation the tension or resistance as set up by spring 11 is sufficient to hold arm 9 with the steering mechanism normally centered for a straight ahead course. In practice the radius of depressions 8' is slightly less than the radius of projections 9', as shown in Fig. 6, whereby the parts are held firmly centered. However, the interfitting parts do not interfere with intentional or voluntary movement of the steering mechanism, the force necessary to overcome the resistance of the improved device being comparatively slight, and the arrangement being such that the resistance is active only when steering the mechanism away from centered position, the resistance then disappearing and not being again encountered until the mechanism is restored to centered position.

I claim:

1. In an automobile steering device, a member immovably attached to the automobile axle, an arm pivoted at one end to said member and at the other end to the automobile steering rod, yieldable means maintaining contact of the adjacent faces of said member and arm, said adjacent faces being substantially flat but provided respectively with one or more depressions and projections adapted to coöperate to resist pivotal movement of said arm when the automobile wheels are in a straight ahead position, but not to so function when the wheels are deflected a predetermined amount from said position.

2. In an automobile steering mechanism, a centering device comprising a plate attached to the automobile axle and a plate attached to the automobile steering rod, said plates being adapted to be turned, one on the other, a spring maintaining contact of said plates, a projection on one plate adapted to fit in a depression on the other plate when the steering mechanism is centered, and to bear on a flat surface of the other plate when the steering mechanism is turned substantially from its centered position.

3. In an automobile steering apparatus, a head fixed to the automobile axle, an arm rotatably mounted on said head and secured to the steering tie rod, spaced recesses in the top of said head, similarly spaced projections in the bottom of said arm, said projections adapted to fit within said recesses when the automobile is moving in a straight line and to be disassociated therefrom when the steering rod is moved to substantially deflect the forward wheels from a straight line.

In testimony whereof I affix my signature in presence of two witnesses.

DUNCAN MACDONALD.

Witnesses:
ERNEST L. SAWYER,
FRANK P. GUCKERT.